US012664015B2

(12) United States Patent
Singh et al.

(10) Patent No.: US 12,664,015 B2
(45) Date of Patent: Jun. 23, 2026

(54) CONTAINER LIFECYCLE MANAGEMENT

(71) Applicant: International Business Machines Corporation, Armonk, NY (US)

(72) Inventors: Nampreet Pal Singh, Pune (IN); Vishal Anand, Dublin (IE); Amit Deshpande, Pune (IN)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 17/462,897

(22) Filed: Aug. 31, 2021

(65) Prior Publication Data

US 2023/0062212 A1    Mar. 2, 2023

(51) Int. Cl.
*G06F 9/48*        (2006.01)
*G06F 9/50*        (2006.01)

(52) U.S. Cl.
CPC ............ *G06F 9/485* (2013.01); *G06F 9/5083* (2013.01)

(58) Field of Classification Search
None
See application file for complete search history.

(56) References Cited

U.S. PATENT DOCUMENTS 10,346,216 B1    7/2019  Yang
2017/0286153 A1*  10/2017  Bak ......................... G06F 9/542
2019/0102226 A1    4/2019  Caldato

| 2019/0171472 | A1* | 6/2019 | Wyble ..................... H04L 67/56 |
| 2019/0243687 | A1* | 8/2019 | Chen .................... G06F 11/3433 |
| 2019/0391897 | A1 | 12/2019 | Vijendra |
| 2020/0192690 | A1* | 6/2020 | Gupta ..................... H04L 67/34 |
| 2022/0164186 | A1* | 5/2022 | Pamidala ............. G06F 9/5088 |
| 2022/0164208 | A1* | 5/2022 | Olmsted-Thompson .................... |
| | | | G06F 9/45558 |
| 2022/0206873 | A1* | 6/2022 | He ........................ G06F 9/4881 |
| 2022/0413894 | A1* | 12/2022 | Anand .................... G06F 9/465 |
| 2023/0004436 | A1* | 1/2023 | Bai ........................ G06F 1/3228 |
| 2023/0063541 | A1* | 3/2023 | Mattar ................. G06F 9/5077 |

OTHER PUBLICATIONS

Yadav, Mahendra Pratap, Rohit, and Dharmendra Kumar Yadav. "Maintaining container sustainability through machine learning." Cluster Computing 24, No. 4 (2021): 3725-3750. (Year: 2021).*
N. D. Nguyen, L.-A. Phan, D.-H. Park, S. Kim and T. Kim, "ElasticFog: Elastic Resource Provisioning in Container-Based Fog Computing," in IEEE Access, vol. 8, pp. 183879-183890, 2020, doi: 10.1109/ACCESS.2020.3029583. (Year: 2020).*
A. Warke, M. Mohamed, R. Engel, H. Ludwig, W. Sawdon and L. Liu, "Storage Service Orchestration with Container Elasticity," 2018 IEEE 4th International Conference on Collaboration and Internet Computing (CIC), Philadelphia, PA, USA, 2018, pp. 283-292, doi: 10.1109/CIC.2018.00046. (Year: 2018).*

(Continued)

*Primary Examiner* — Frank D Mills

(74) *Attorney, Agent, or Firm* — Heather Schuler

(57)        ABSTRACT

A system may include a memory and a processor in communication with the memory. The processor may be configured to perform operations. The operations may include monitoring a container. The operations may further include identifying a usage variance of the container based on consumption information for the container. The operations may also include managing an uptime of the container based on the usage variance.

17 Claims, 6 Drawing Sheets

100

(56)            References Cited

OTHER PUBLICATIONS

Anonymous. "docker stop." Printed Jul. 20, 2021. 2 pages. Published by docker docs. https://docs.docker.com/engine/reference/commandline/stop/.

Anonymous. "Enterprise-grade Serverless on your own terms." Printed Jul. 20, 2021. 3 pages. Published by Knative. https://knative.dev/docs/.

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

300

310  Monitor Containers

320  Identify Container Consumption

330  Configure for Usage Variance

340  Manage Container Uptime

400

500

CONTAINER LIFECYCLE MANAGEMENT

BACKGROUND

The present disclosure relates to digital storage management and more specifically to open-source container lifecycle management.

Cloud computing increasingly implements container systems for deployment. Open-source container environments offer adaptive load balancing, service registration, deployment, operation, resource scheduling, and capacity scaling. A container cluster employs nodes to perform workloads.

SUMMARY

Embodiments of the present disclosure include a system, method, and computer program product for lifecycle management of a container.

A system in accordance with the present disclosure may include a memory and a processor in communication with the memory. The processor may be configured to perform operations. The operations may include monitoring a container. The operations may further include identifying a usage variance of the container based on consumption information for the container. The operations may also include managing an uptime of the container based on the usage variance.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
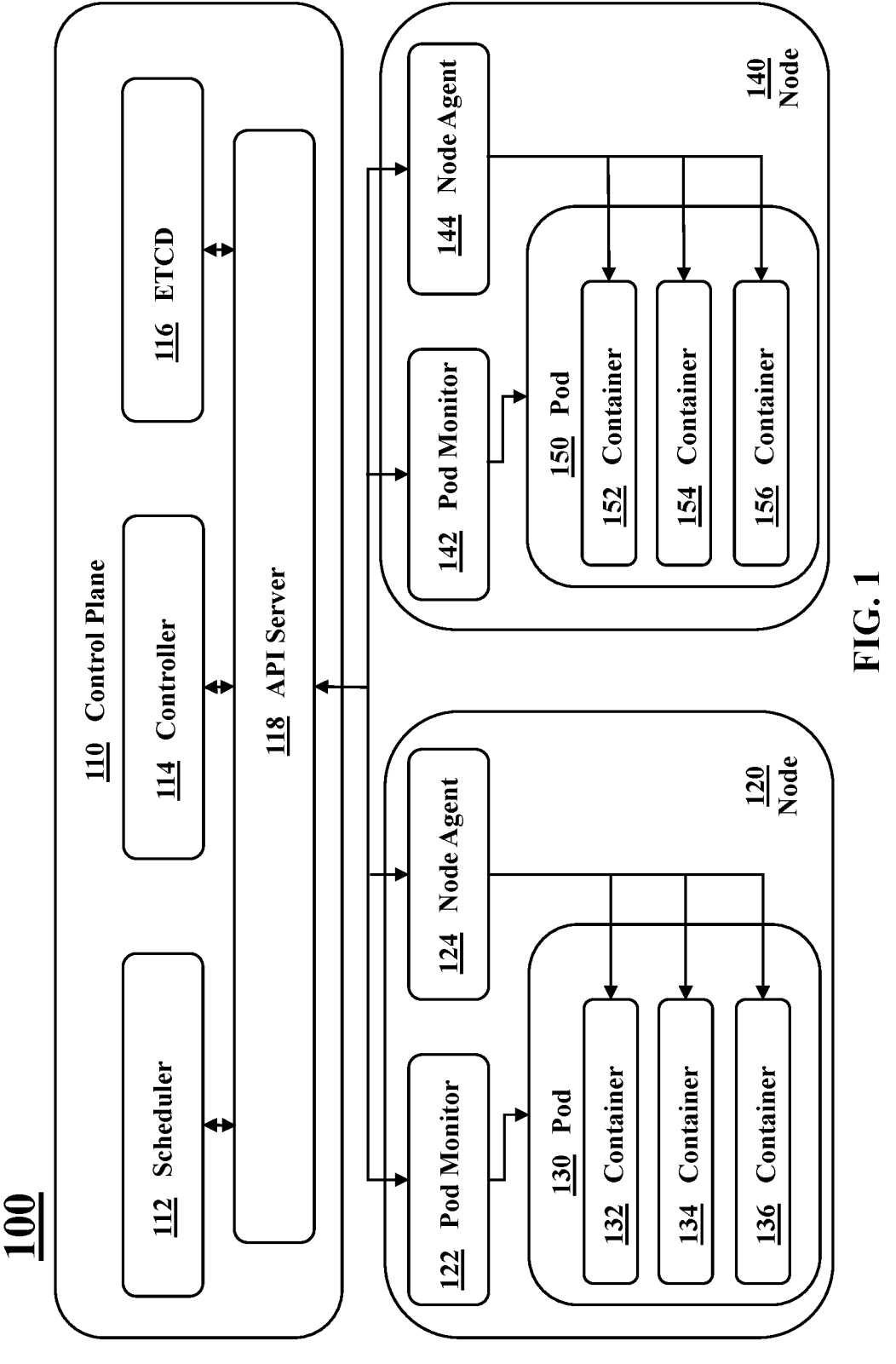
FIG. 1 illustrates an embodiment of a container lifecycle management system in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to digital storage management and more specifically to open-source container lifecycle management.

Container orchestration systems (e.g., open-source container orchestration systems such as a Kubernetes® cluster, which may also be referred to as a k8s® cluster) provide support for automating containerized application deployment, scaling, and management. Containerized applications are typically deployed in a unit referred to as a pod, and a pod may have one or more containers running within it. As part of pod lifecycle management, a container orchestration system provides one or more mechanisms for activating (also referred to as deploying or starting), running, and deactivating (also referred to as stopping) pods. When a pod is activated, all containers within that pod may also be activated; similarly, when a pod stops, all containers within that pod stop.

A container orchestration system may use multiple mechanisms to activate multiple pods of the same or similar deployment. Similarity of deployment may be based on various parameters such as the number of requests, central processing unit (CPU) utilization, memory utilization, and the like. A container orchestration system may use such systems to implement automatic scaling of an open-source container system. In accordance with some embodiments of the present disclosure, managing container availability may increase resource utilization.

In accordance with the present disclosure, one or more containers within a multiple container pod may be activated or deactivated. Activating and/or deactivating only certain containers within a pod may enable more tailored use of the pod, thereby increasing resource utilization of the open-source container cluster the pod is in.

For example, a particular functionality may be used as an application programming interface (API) and support batch processing. There are multiple ways to achieve such a goal, including using one application for implementing a core business functionality, another application for exposing the functionality as an API, and yet another application for providing batch processing using a core business functionality. These three applications may be containerized as three separate containers and deployed in a single pod; implementing all of the applications in a single pod may minimize latency. An API container may be used to support main online functionality; the API may be necessary only during certain hours (e.g., during the workday, or during peak usage time). A batch container may be used to sustain support functionalities; the batch container may only be necessary during certain hours (e.g., outside of a normal workday, or during times of minimal usage of the pod). In accordance with the present disclosure, select containers within a pod may run independently (e.g., at different times), minimizing uptime of containers and, as a result, conserving compute resources.

In accordance with the present disclosure, one or more individual containers within a pod may be activated, run, and deactivated independent of other containers in the pod.

A system in accordance with the present disclosure may include a memory and a processor in communication with the memory. The processor may be configured to perform operations. The operations may include monitoring a container. The operations may further include identifying a usage variance of the container based on consumption information for the container. The operations may also include managing an uptime of the container based on the usage variance.

In some embodiments, the operations may further include configuring a schedule of the usage variance. A schedule may include, for example, active times and hibernation times. In some embodiments, the uptime of the container is aligned with the schedule.

In some embodiments, the operations may further include detecting service requirements the container. Service requirements may include, for example, requiring downtime, maintenance, or the like.

In some embodiments, the operations may further include controlling the container independent of a pod, wherein the container is in the pod. In such embodiments, a container within a pod may be activated, hibernated, or otherwise given commands to perform independent of commands given to other containers in in the pod. For example, one container in a pod may be instructed to activate to perform tasks whereas another container in the pod may be instructed to hibernate, and each of the containers may carry out the commands independent of each other.

In some embodiments, the monitoring of the container is performed by a pod monitor, and the container is in a first location whereas the pod monitor is in a second location. In such embodiments, the pod monitor may be on a first cluster and the container may be on a second cluster; in some embodiments, the pod monitor may be on one node in a cluster and the container may be on another node in the same cluster. Alternatively, the pod monitor may be on a control plane within the same cluster as the container. In contrast, in some embodiments, the pod monitor may be on the same node as the container it monitors. In some embodiments, the pod monitor may be located within the pod it monitors such that the pod monitor and the container monitor are hosted by the same pod.

In some embodiments, the operations may further include injecting a custom configuration on the container. Custom configurations may include, for example, setting one or more times for activity, setting one or more times for hibernation, and other container configurations which may be recognized by a person of skill in the art.

In accordance with the present disclosure, a pod monitor component may be configured to communicate with an open-source container cluster API server. The pod monitor may also be referred to as a kube-watch, an open-source container orchestration observer, a container monitor, a system utilization overseer, a monitor, or similar. The pod monitor may convey metrics to an API server to trigger the API server to talk with a node agent to perform any necessary action.

A pod monitor may perform one or more functions. The functions of a pod monitor may include, for example, gathering information about each container, collecting information about each pod, identifying and/or configuring peak hours, identifying and/or configuring off-peak hours, managing container utilization, updating the control plane (via, for example, the API server), and triggering a container lifecycle in the control plane.

In accordance with the present disclosure, a pod monitor may enable life cycle management control with granularity on the container level; the pod monitor may, for example, identify and track consumption of resources at a container level. In some embodiments, a pod monitor may identify the consumption of one or more individual containers on a business application and/or service level.

A pod monitor in accordance with the present disclosure may be native to an open-source container cluster concept and/or framework; it may be added to the native architecture of an open-source container cluster. The pod monitor may track containers, services, business applications, containers usage, triggers requests, listening ports, traffic, and the like.

Container hibernation may enable the preservation of compute resources by hibernating one or more containers when not in use and/or when the containers are projected to not be in use. The present disclosure considers using a pod monitor for management of individual containers. A pod monitor may be used, for example, to hibernate one or more containers within a pod based on the usage and/or anticipated usage of the particular container. Time a container is hibernating may be referred to as hibernation time. A pod monitor may, for example, hibernate one or more containers within the monitored pod for a specific amount of time.

Hibernation time may be manually set, automatically set, or some combination thereof. For example, manually set hibernation times may include setting an API container to hibernate outside of business hours (e.g., 7 pm through 7 am) and a batch container may be hibernated during normal business hours (e.g., 7 am through 7 pm). In some embodiments, an API container and a batch container may be set to alternatively hibernate such that the batch container hibernates while the API container is active and the API container hibernates while the batch container is active. In some embodiments, each container may be set to an individual active and hibernating schedule specific to the container; for example, an API container may be set to be active during the workweek from 9 am until 6 pm and hibernate at all other times, and a batch container may be set to be active from 10 pm until 5 am every day.

Hibernation time may be set automatically. For example, an open-source container system may be monitored by a pod monitor which may identify times when a container is consuming compute resources. The pod monitor may configure a hibernation schedule for the usage variance of each container; for example, the pod monitor may identify that the earliest a container is used is 8:17 am and the latest that container is used is 7:23 pm, establish an activity schedule accordingly, and identify that the container may be hibernated from 7:24 pm until 8:16 am. Individual containers within a pod may have individual hibernation schedules based on the usage of the specific container.

A combination of manual and automatic scheduling may be, for example, a user identifying certain time blocks on certain days and instructing an automation mechanism to optimize active and hibernation time within the preset parameters.

In some embodiments, it may be preferable to add buffer time to ensure a container is ready for use; a buffer time may be, for example, eight minutes, such that usage tracked from 8:17 am through 7:23 pm may result in the container being activated at 8:09 am and hibernated at 7:31 pm. Buffer times may be set manually (e.g., a user indicates a container, pod, or system is to have ten minutes of buffer time) or automatically (e.g., the system identifies how long it requires to activate a container and a likelihood of activity outside of normal active time, using the information to calculate a buffer time).

A combination of manual and automatic scheduling may include an automated system setting the base parameters and a user manually selecting an amount of buffer time. For example, the system may identify that a container is in use from 9:02 am through 6:37 pm each day and set that time bracket as the base active timeslot and the remainder of the time (here, 6:38 pm through 9:01 am) as the base hibernation timeslot. A user may manually select 25 minutes of buffer time such that the effective active timeslot for the container is from 8:37 am through 7:02 pm and the container is hibernated from 7:03 pm through 8:36 am.

Hibernation of individual containers according to their specific usage within pods may minimize resource consumption while maintaining system performance. As a result, hibernation of individual containers may result in reduced costs for users.

Usage of a pod monitor to manage individual containers may also empower users to inject custom configurations at the container level. A pod monitor enables a user to control an open-source container system at the container level, and such level of granularity may result in the ability to customize the usage of the system to optimize resource utilization, system customization, and the like. The present disclosure further provides flexibility to users to inject custom configurations on the container level. Customizations may be made through a user interface (UI).

In accordance with the present disclosure, an open-source container system may act at a container level. Such action may be done via a node agent. In some embodiments, a pod monitor may be used with containers external to an open-source container system. For example, a pod monitor may be implemented in the open-source container system owned by a user, and the user may rent additional computation power and storage space during a season of high activity; the rented computation power and storage space may not be part of an open-source container system, or it may be part of a different type of open-source container system, and the pod monitor may act between the user-owned system and the user-rented system to provide control at the container level of granularity of a pod within the user-rented system. Similarly, the present disclosure considers other cross-system uses for enabling granularity-level control.

The present disclosure presents a pod monitor component (which may also be referred to as a kube-watch, a container observer, an open-source container orchestrator, and the like). The pod monitor may keep track of containers, services, business applications, containers usage, triggers requests, listening ports, traffic, and similar system-related information. The pod monitor may be added or embedded into the open-source container native architecture. Use of a pod monitor may enable a node agent (e.g., a kubelet) to act on the container level; in some embodiments, the pod monitor may communicate with node agents and containers external to the platform the pod monitor is hosted on, including node agents and containers that may not use an open-source container orchestration platform.

A pod monitor may identify the individual consumption of one or more containers on a business application level or service level. A pod monitor may keep track of individual container activities of one or more containers in a way native to an open-source container system such that containers that are not being used by an application or service for a period of time are documented by the pod monitor and/or a system in communication therewith. A pod monitor may track the consumption and/or usage of multiple containers in a pod; each pod across a node within a cluster may use different pod monitors, or the same pod monitor may be used for each pod within a node or within a cluster.

A pod monitor may hibernate one or more containers within a pod for a specific duration to minimize resource consumption. A pod monitor may continue tracking (which may also be referred to as listening to) the relevant business application and/or service requirements of hibernated and/or active (also referred to as running) containers within a pod.

A UI may be implemented to translate internal mechanics to the user for consumption, consistency, dashboarding, and other relevant purposes. A pod monitor may provide flexibility to users to inject custom configurations on the container level; such custom configurations may be achieved through use of the UI.

FIG. 1 illustrates a container lifecycle management system 100 in accordance with some embodiments of the present disclosure. The container lifecycle management system 100 includes a control plane 110 and nodes 120 and 140 in communication therewith. FIG. 1 is illustrated as a container lifecycle system 100 having one control plane 110 and two nodes 120 and 140 each with one pod 130 and 150; one skilled in the art will recognize that such a system may have multiple control planes, include various numbers of nodes, that each node may have multiple pods, and that the number of pods may vary between nodes.

The control plane 110 has a scheduler 112, a controller 114, an etcd 116, and an API server 118. The API server 118 communicates with each of the other components of the control plane 110 including the scheduler 112, the controller 114, and the etcd 116. The API server 118 also communicates with components external to the control plane 110. The control plane 110 may also communicate with the nodes 120 and 140 on the cluster via the API server 118.

The API server 118 communicates with the pod monitors 122 and 142 and the node agent 124 and 144 of each node 120 and 140. Each pod monitor 122 and 142 communicates with the API server 118 to relay pod 130 and 150 metrics to the control plane 110. Metrics of the pods 130 and 150 may include the metrics of the containers 132, 134, 136, 152, 154, and 156 in the pods 130 and 150.

The information the pod monitors 122 and 142 relay to the API server 118 about the metrics of each of the containers 132, 134, 136, 152, 154, and 156 and/or other information about the pods 130 and 150 may trigger one or more actions. The control plane 110 may use the information to submit, via the API server 118, one or more actions to the node agents 124 and 144. The node agents 124 and 144 may then perform the action. Such an action may include, for example, activating or hibernating one or more containers 132, 134, 136, 152, 154, and 156.

The pod monitors 122 and 142 may be driven by manual configuration (e.g., user-input parameters), built as an intelligent component (e.g., collects data, engages in machine learning, and sets parameters automatically), or a combination thereof. A pod monitor 122 may collect information about the pod 130 it monitors, collect information about each container 132, 134, and 136 within the pod 130, identify and/or configure peak and off-peak hours for individual containers 132, 134, and 136 and/or pod 130, track utilization of the containers 132, 134, and 136, provide updates to the control plane 110 via the API server 118, and/or trigger lifecycles of the containers 132, 134, and 136, via the control plane 110.

The pod monitors 122 and 142 may monitor the metrics of individual containers 132, 134, 136, 152, 154, and 156 in the pods 130 and 150. The pod monitors 122 and 142 may then convey the observed metrics to the API server 118. According to the deployment configuration (which may be set manually, automatically, or some combination thereof), the pod monitors 122 and 142 may identify to the API server 118 what trigger condition activates or deactivates one or more containers 132, 134, 136, 152, 154, and 156 and/or entire pods 130 and 150 and, when applicable, that a trigger has been met and the corresponding action should be commenced.

For example, a first trigger condition may be to activate one of the containers 136 and 156 in each pod 130 and 150 at dawn; the pod monitors 122 and 142 may identify the trigger to the API server 118. The pod monitors 122 and 142 may notify the API server 118 when the trigger has been achieved (here, that it is dawn). The API server 118 may, in turn, communicate the action (here, activation of certain containers 136 and 156) to the node agents 124 and 144. The node agents 124 and 144 may then activate the relevant containers 136 and 156.

In another example, a second trigger may be to hibernate or deactivate one of the containers 136 and 156 in each pod 130 and 150 at dusk; the pod monitors 122 and 142 may identify the trigger to the API server 118. The pod monitors 122 and 142 may notify the API server 118 when the trigger has been achieved (here, that it is dusk). The API server 118 may, in turn, communicate the action (here, hibernation of containers 136 and 156) to the node agents 124 and 144. The node agents 124 and 144 may then hibernate the relevant containers 136 and 156.

Figure 2:
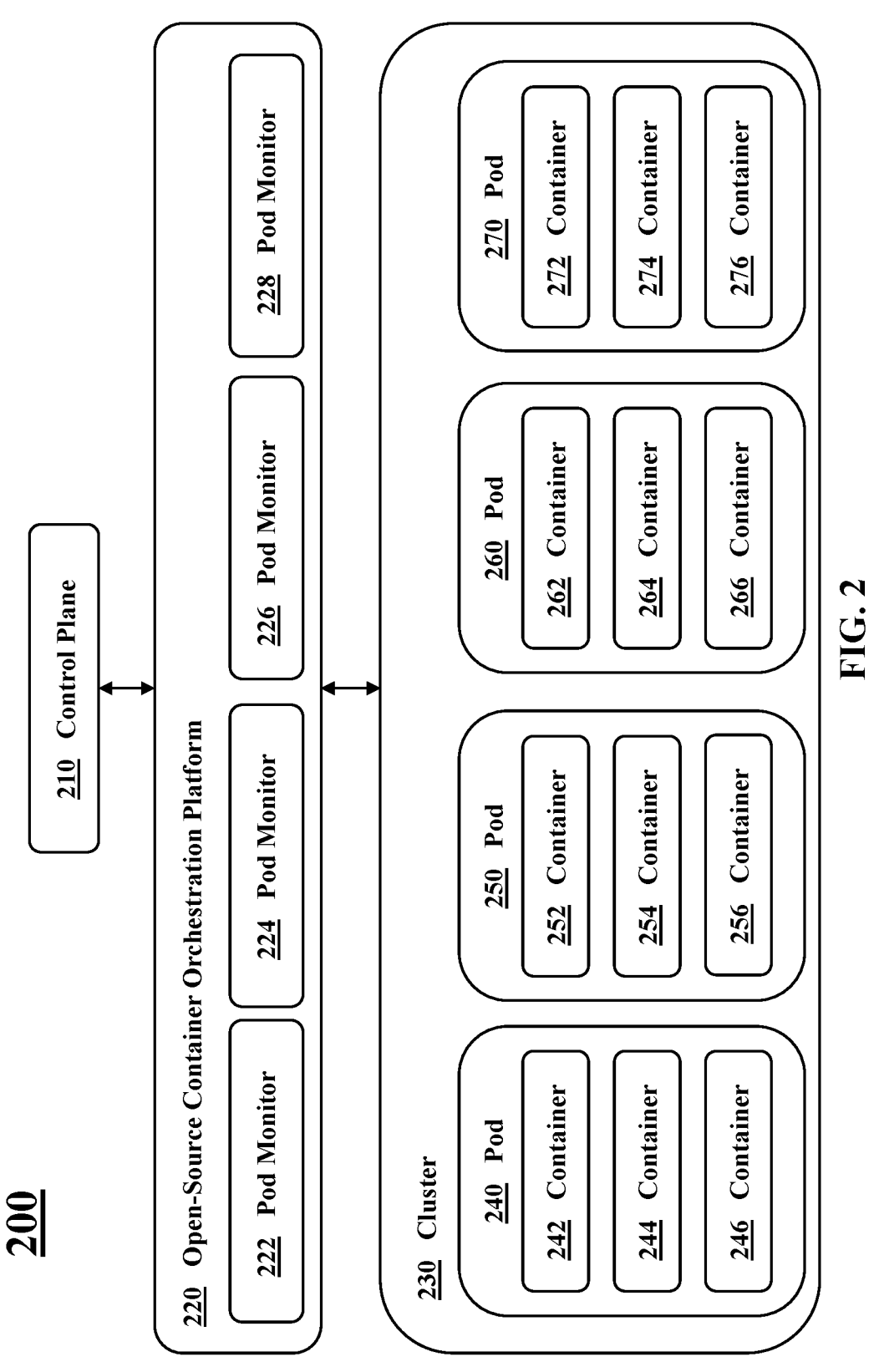
FIG. 2 depicts an embodiment of a container lifecycle management system in accordance with some embodiments of the present disclosure.

FIG. 2 depicts a container lifecycle management system 200 in accordance with some embodiments of the present disclosure. The container lifecycle management system 200 includes a control plane 210, an open-source container orchestration platform 220, and a cluster 230 (e.g., an open-source container cluster).

In this embodiment, the open-source container orchestration platform 220 contains the pod monitors 222, 224, 226, and 228 that observe the containers 242, 244, 246, 252, 254, 256, 262, 264, 266, 272, 274, and 276 in a separate cluster 230. The pod monitors 222, 224, and 226 may be on the same cluster 230 as the pods 240, 250, 260, and 270 and containers 242, 244, 246, 252, 254, 256, 262, 264, 266, 272, 274, and 276 they are monitoring, or they may be in one or more different locations in communication with the containers 242, 244, 246, 252, 254, 256, 262, 264, 266, 272, 274, and 276. For example, some pod monitors may share a node with the pod they monitor whereas other pod monitors within the same system may be spread over other clusters. Latency may be reduced by keeping the pod monitors 222, 224, 226, and 228 close (physically, electrically, and/or virtually) to the components they are observing.

The container lifecycle management system 200 is shown with one cluster 230 having four pods 240, 250, 260, and 270 with three containers 242, 244, 246, 252, 254, 256, 262, 264, 266, 272, 274, and 276 each. Hibernating one or more pods 240, 250, 260, and 260 while not in use may preserve resources.

By way of example, if each container 242, 244, 246, 252, 254, 256, 262, 264, 266, 272, 274, and 276 uses 0.5 virtual CPU (vCPU) and 2 gigabytes (GB) of memory per hour, each pod 240, 250, 260, and 280 consumes 1.5 vCPU and 6 GB of memory per hour. A pod 240 with multiple containers 242, 244, and 246 may actively use two of the containers 242 and 244 continuously and one of the containers 246 for only sixteen hours per day. Hibernating the container 246 for the eight hours per day it is not in use may conserve 0.5 vCPU and 2 GB of per hour for a total of 4 vCPU and 16 GB resources preserved per day.

In certain production environments, such as complex production environment, many clusters each with many pods each with many containers may be employed. Pod monitors may be used to oversee the management of the lifecycles of the containers to potentially preserve thousands of vCPU and terabytes (TB) of memory daily. For example, in an environment with 1000 pods that may each be hibernated for eight hours per day, using pod monitors may enable the conservation of 4000 vCPU and 16 TB worth of resources per day. Larger and more complex systems may see additional benefit of resource conservation.

Figure 3:
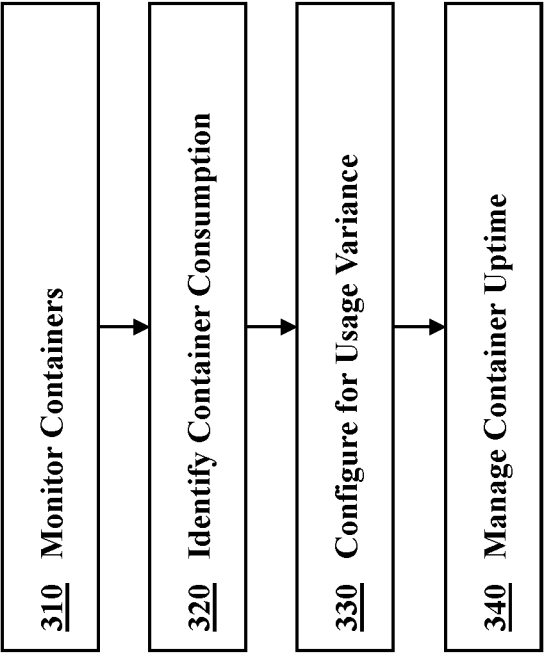
FIG. 3 illustrates a method for managing container lifecycles in accordance with some embodiments of the present disclosure.

FIG. 3 illustrates a method 300 in accordance with some embodiments of the present disclosure. The method 300 includes monitoring 310 one or more containers and identifying 320 the resource consumption of the containers. The resource consumption information identified may include the amount of resources consumed by each pod and when the pods consume the resources.

The method 300 may further include configuring 330 an activity schedule to account for usage variance. The activity schedule may, for example, include one or more active times and one or more hibernation times specific to each container. Accounting for the usage variance of a pod may include tailoring container active times to when the container has historically used resources to complete one or more tasks (e.g., not sitting idle) and tailoring hibernation times to when a container historically has not been completing tasks (e.g., sitting idle).

The method 300 may further include managing 340 container uptime. Managing 340 the container uptime may include activating and/or deactivating a relevant container in accordance with projected use of a container. The projected use of a container may be reflected in the activity schedule. For example, managing 340 the uptime for a pod set for hibernation at dawn and activation at dusk may result in a pod monitor notifying an API server that the hibernation condition (here, dawn) has been achieved, the API server notifies the node agent, and the node agent hibernates the pod. Similarly, managing 340 the uptime for a pod set for hibernation at dawn and activation at dusk may result in a pod monitor notifying an API server that the activation condition (here, dusk) has been achieved, the API server notifies the node agent, and the node agent activates the pod.

In accordance with some embodiments, the method 300 may be performed using a container lifecycle management system (e.g., such as the systems shown in FIG. 1 and FIG. 2). For example, monitoring 310 the containers and identifying 320 container consumption may be achieved using a pod monitor. The pod monitor may relay container information to a control plane (e.g., via an API server) and configuring 330 a container hibernation schedule may be performed via the control plane. Configuring 330 the activity schedule may be done manually (e.g., a user selects a hibernation schedule), automatically (e.g., the system calculates a pattern of idle time for a container and sets the container to be idle during the idle times), or some combination thereof (e.g., a user selects a minimum of one hour of idle time to trigger recognition in an idling pattern). Managing 340 the container uptime could be effectuated by the control plane notifying a node agent to hibernate a container, and the node agent then hibernates that container.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
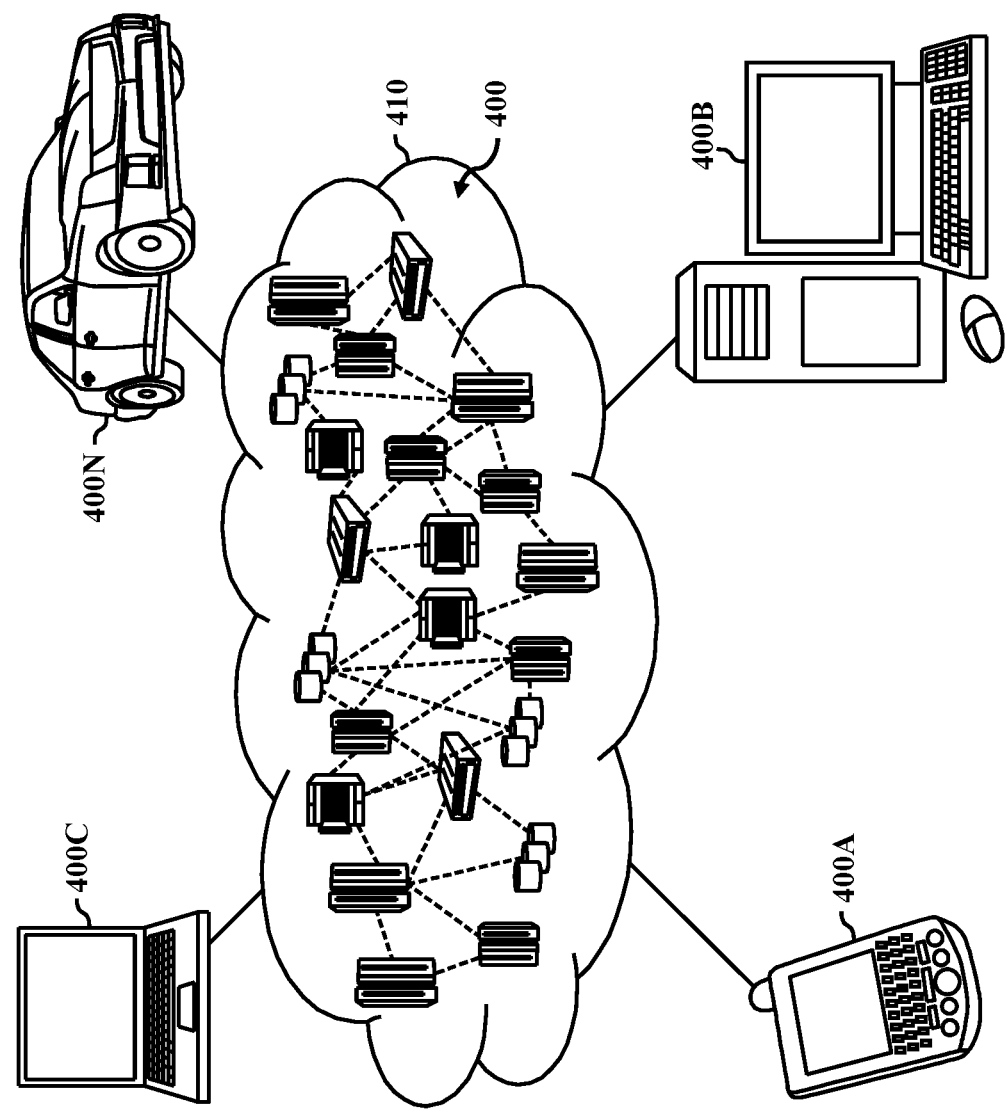
FIG. 4 depicts a cloud computing environment, in accordance with embodiments of the present disclosure.

FIG. 4 illustrates a cloud computing environment 410 in accordance with embodiments of the present disclosure. As shown, cloud computing environment 410 includes one or more cloud computing nodes 400 with which local computing devices used by cloud consumers such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as private, community, public, or hybrid clouds as described hereinabove, or a combination thereof.

This allows cloud computing environment 410 to offer infrastructure, platforms, and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
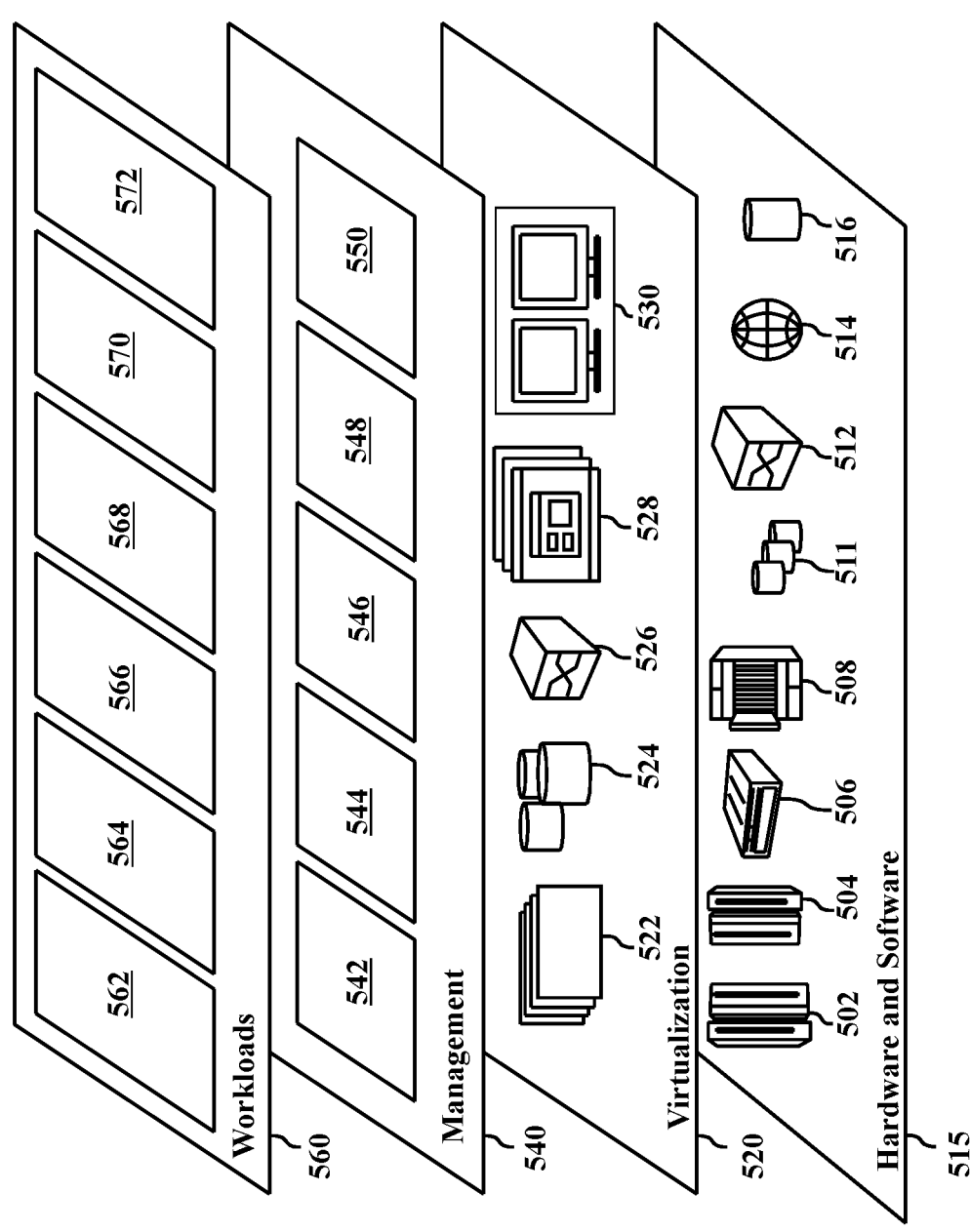
FIG. 5 illustrates abstraction model layers for a cloud computing environment, in accordance with embodiments of the present disclosure.

FIG. 5 illustrates abstraction model layers 500 provided by cloud computing environment 410 (FIG. 4) in accordance with embodiments of the present disclosure. It should be understood in advance that the components, layers, and functions shown in FIG. 5 are intended to be illustrative only and embodiments of the disclosure are not limited thereto. As depicted below, the following layers and corresponding functions are provided.

Hardware and software layer 515 includes hardware and software components. Examples of hardware components include: mainframes 502; RISC (Reduced Instruction Set Computer) architecture-based servers 504; servers 506; blade servers 508; storage devices 511; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and pricing 544 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 546 provides access to the cloud computing environment for consumers and system administrators. Service level management 548 provides cloud computing resource allocation and management such that required service levels are met. Service level agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and open-source container lifecycle management 572.

Figure 6:
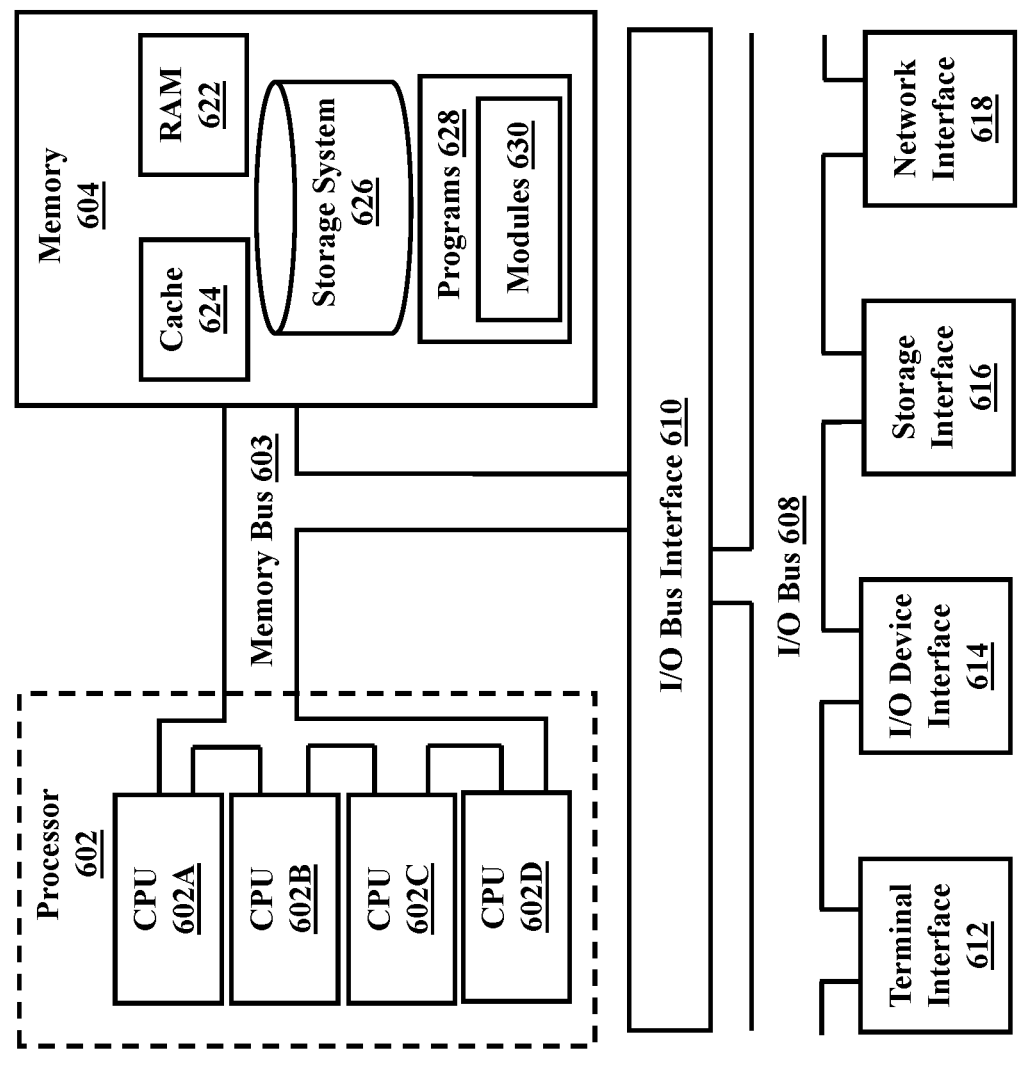
FIG. 6 depicts a high-level block diagram of an example computer system that may be used in implementing one or more of the methods, tools, and modules, and any related functions, described herein, in accordance with embodiments of the present disclosure.

FIG. 6 illustrates a high-level block diagram of an example computer system 601 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 601 may comprise a processor 602 with one or more central processing units (CPUs) 602A, 602B, 602C, and 602D, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable CPUs 602A, 602B, 602C, and 602D, herein generically referred to as the CPU 602. In some embodiments, the computer system 601 may contain multiple processors typical of a relatively large system; however, in other embodiments, the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630, may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units 610 are shown, which separate the I/O bus 608 from various communications paths running to the various I/O devices, in other embodiments some or all of the I/O devices may be connected directly to one or more system I/O buses 608.

In some embodiments, the computer system 601 may be a multi-user mainframe computer system, a single-user system, a server computer, or similar device that has little or no direct user interface but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system comprising:

a memory; and a processor in communication with said memory, said processor being configured to perform operations, said operations comprising:

hosting a pod monitor on a container cluster;

monitoring a container in a pod with said pod monitor, wherein said container is hosted by said container cluster, and wherein said pod monitor monitors said container in said pod at a container level of granularity;

engaging in machine learning with said pod monitor to identify a usage variance of said container based on historical consumption information for said container;

managing, automatically with said pod monitor, a schedule of said container specific to said container based on said usage variance of said container; and hibernating, automatically with said pod monitor, said container based on said schedule of said container, wherein said container is hibernated independent of said pod.

2. The system of claim 1, further comprising:

configuring said schedule of said usage variance.

3. The system of claim 2, wherein:

an uptime of said container aligns with said schedule.

4. The system of claim 1, further comprising:

detecting service requirements of said container.

5. The system of claim 1, wherein:

said container is in a first location and said pod monitor is in a second location.

6. The system of claim 1, further comprising:

injecting a custom configuration on said container.

7. A method comprising:

hosting a pod monitor on a container cluster;

monitoring a container in a pod with said pod monitor, wherein said container is hosted on said container cluster, and wherein said pod monitor monitors said container in said pod at a container level of granularity;

engaging in machine learning with said pod monitor to identify a usage variance of said container based on historical resource consumption information for said container, wherein said usage variance is a difference of resource consumption of said container between a first time and a second time;

updating a control plane of said usage variance;

managing, automatically with said pod monitor, a schedule of said container specific to said container based on said usage variance of said container; and hibernating, automatically with said pod monitor, said container based on said schedule of said container, wherein said container is hibernated independent of said pod.

8. The method of claim 7, further comprising:

configuring said schedule of said usage variance.

9. The method of claim 8, wherein:

an uptime of said container aligns with said schedule.

10. The method of claim 7, further comprising:

detecting service requirements of said container.

11. The method of claim 7, wherein:

said container is in a first location and said pod monitor is in a second location.

12. The method of claim 7, further comprising:

injecting a custom configuration on said container.

13. A computer program product comprising a computer readable storage medium having program instructions embodied therewith, said program instructions executable by a processor to cause said processor to perform a function, said function comprising:

hosting a pod monitor on a container cluster;

monitoring a container in a pod with said pod monitor, wherein said container is hosted on said container cluster, and wherein said pod monitor monitors said container in said pod at a container level of granularity;

engaging in machine learning with said pod monitor to identify a usage variance of said container based on historical consumption information for said container;

managing, automatically with said pod monitor, a schedule of said container specific to said container based on said usage variance of said container; and hibernating, automatically with said pod monitor, said container based on said schedule of said container, wherein said container is hibernated independent of said pod.

14. The computer program product of claim 13, further comprising:

configuring said schedule of said usage variance.

15. The computer program product of claim 14, wherein:

an uptime of said container aligns with said schedule.

16. The computer program product of claim 13, wherein:

said container is in a first location and said pod monitor is in a second location.

17. The computer program product of claim 13, further comprising:

injecting a custom configuration on said container.

\* \* \* \* \*